J. L. SPRAGUE.
CHURN.
No. 172,194.  Patented Jan. 11, 1876.
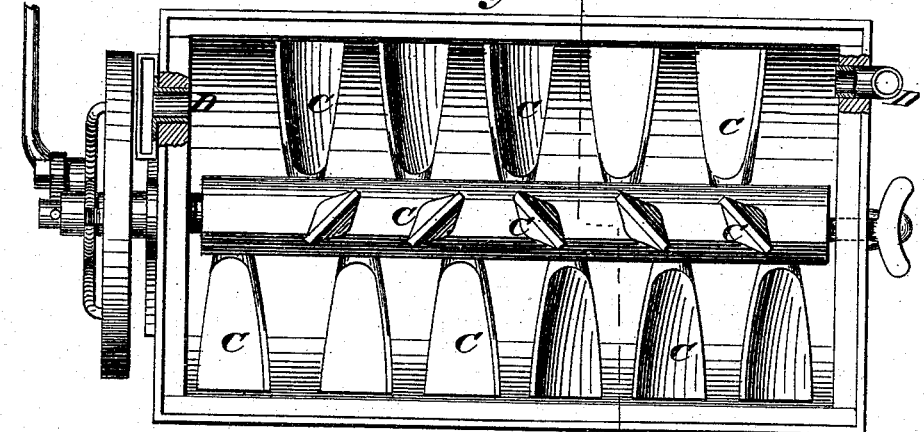
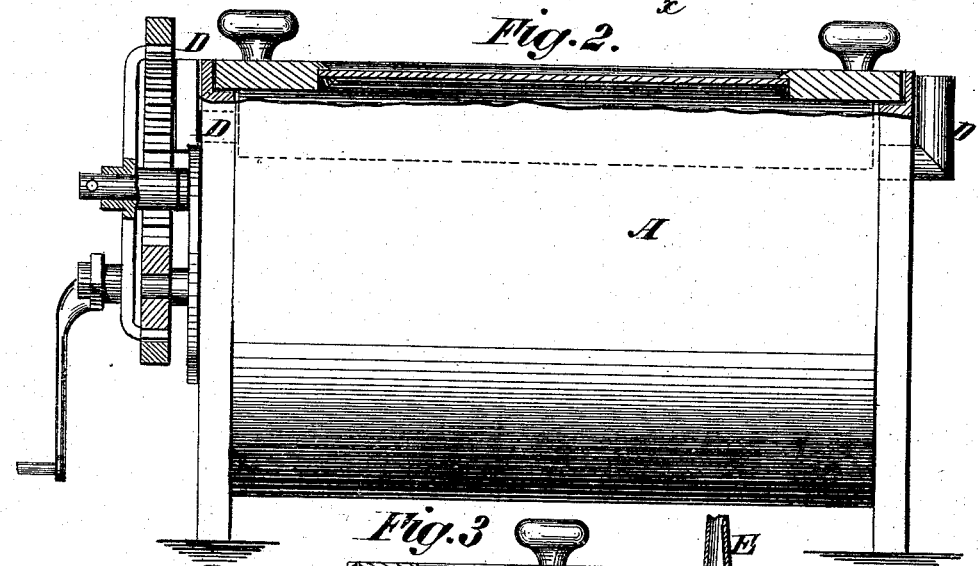
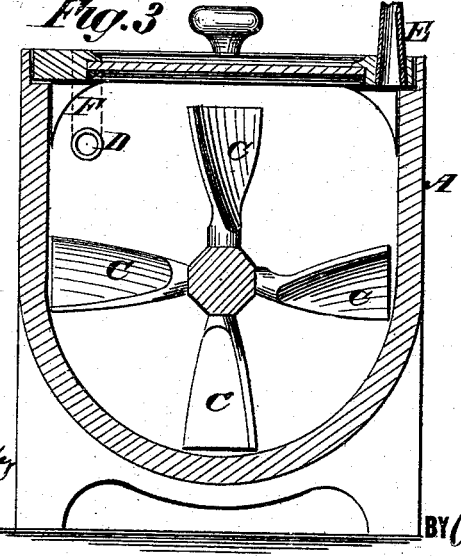
WITNESSES:
Francis McCauley
Alex F. Roberts
INVENTOR:
J. L. Sprague
BY
ATTORNEYS.

UNITED STATES PATENT OFFICE.

JAMES L. SPRAGUE, OF HERMON, NEW YORK.

IMPROVEMENT IN CHURNS.

Specification forming part of Letters Patent No. 172,194, dated January 11, 1876; application filed October 16, 1875.

*To all whom it may concern:*

Be it known that I, JAMES LYNN SPRAGUE, of Hermon, in the county of St. Lawrence and State of New York, have invented a new and Improved Churn, of which the following is a specification:

My invention consists of spiral or propeller shaped paddles on a horizontal shaft, pitched so as to draw the cream from each end toward the center, in combination with an air-inlet at each end, and an outlet at the middle, whereby the paddles cause air to draw in at the ends, and to escape at the center, after acting on the cream, thus increasing the efficiency of the air, which is an element of considerable importance in the churning process.

My invention also consists of concave corner-pieces in the angles between the flat top and vertical sides of the churn-box to prevent the clogging of the cream in these angles, so common in churns of this form.

Figure 1 is a horizontal section of a churn constructed according to my invention. Fig. 2 is partly a side elevation, and partly a sectional elevation. Fig. 3 is a transverse section, taken on line $x\,x$ of Fig. 1.

Similar letters of reference indicate corresponding parts.

A is a horizontal cream-box, having a round bottom and flat top. B is the paddle-shaft; C, the paddles; D, the air-inlets; E, the outlet, and F the corner-pieces in the angles between the sides and top. The paddles are pitched in opposite directions from each end of the churn to the center, so as to draw the cream and air thereto, and thereby effecting the most intimate contact of the air and cream, and thus obtaining the best results of atmospheric action.

The corner-pieces F round up the upper portion of the churn-case, so that the lodging of cream thereat is prevented.

Having thus described my invention, I claim as new and desire to secure by Letters Patent—

The combination, with rotary paddles C, of cream-box A, having air-inlets D D, one at each end, and an outlet, E, over the space between the reversely-spiraled paddles, as and for the purpose specified.

JAMES L. SPRAGUE.

Witnesses:
OTIS EARLE,
JAMES K. HALE.